US006393135B1

(12) United States Patent
Girardi et al.

(10) Patent No.: US 6,393,135 B1
(45) Date of Patent: May 21, 2002

(54) OLE AUTOMATION SERVER FOR MANIPULATION OF MAIL PIECE DATA

(75) Inventors: Victor Girardi, Oxford, CT (US); Michael Kelley, Woodinville, WA (US); Paul A. Kovlakas, Milford, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 08/997,696

(22) Filed: Dec. 23, 1997

(51) Int. Cl.$^7$ .................................................. G06K 9/00

(52) U.S. Cl. ....................................... 382/101; 713/200

(58) Field of Search ...................... 706/46–48; 709/201, 709/203; 713/200, 176, 201; 382/101, 100

(56) References Cited

U.S. PATENT DOCUMENTS

| | | | | |
|---|---|---|---|---|
| 4,858,907 | A | 8/1989 | Eisner | 271/124 |
| 5,121,484 | A | 6/1992 | Hirami et al. | 395/275 |
| 5,175,691 | A | 12/1992 | Baker et al. | 364/478 |
| 5,278,947 | A | 1/1994 | Balga et al. | 395/117 |
| 5,326,181 | A | 7/1994 | Eisner et al. | 400/104 |
| 5,359,712 | A | 10/1994 | Cohen et al. | 395/161 |
| 5,379,426 | A | 1/1995 | Foss et al. | 395/650 |
| 5,423,043 | A | 6/1995 | Fitzpatrick et al. | 395/700 |
| 5,463,770 | A | 10/1995 | Todd | 395/600 |
| 5,487,141 | A | 1/1996 | Cain et al. | 395/135 |
| 5,495,565 | A | 2/1996 | Millard | 395/147 |
| 5,499,369 | A | 3/1996 | Atkinson | 395/650 |
| 5,517,605 | A | 5/1996 | Wolf | 395/155 |
| 5,519,828 | A | 5/1996 | Rayner | 395/161 |
| 5,546,577 | A | 8/1996 | Marlin et al. | 395/600 |

(List continued on next page.)

FOREIGN PATENT DOCUMENTS

EP 0735 722 A2 2/1996

OTHER PUBLICATIONS

"The Java Tutorial," for the Internet, sun Microsystems, Inc. 1995.

"Object–Oriented Modeling and Design," Prentice Hall, New Jersey.

"AddressRight Mailpiece OCX Functional Requirements Specification", May 22, 1997.

"In windows, what is OLE?," The Trustees of Indiana University, 1997.

*Primary Examiner*—Yon J. Couso
(74) *Attorney, Agent, or Firm*—Brian A. Lem; Angelo N. Chaclas

(57) ABSTRACT

The invention is a method for creating a mailpiece object. The method includes encapsulating a software control within an object to form a mailpiece object, wherein the mailpiece object is OLE enabled. Encapsulation of the software control provides a software application with a set of mailpiece production capabilities when the mailpiece object is embedded within the application. The method begins with the instantiation of the mailpiece object which establishes a programming interface for the object. The properties of the mailpiece object are then established by: placing a set of object methods; a set of mailpiece production functionalities; and, a set of data tables within the mailpiece object by utilizing the programming interface. A human interface is next established and placed within the mailpiece object by utilizing the programming interface. The mailpiece object is then embedded within a software application; and the embedded mailpiece object is utilized to produce a mailpiece under direction of the software application. Once embedded in the one or more software applications selected by the data processing system and the system user, the embedded mailpiece object becomes an OLE enabled OCX and, the OCX further includes a set of pre-determined mailpiece production functions and a property setting comprising selectable functionality for one or more postal markets.

10 Claims, 6 Drawing Sheets

U.S. PATENT DOCUMENTS

| | | | | | |
|---|---|---|---|---|---|
| 5,550,976 | A | | 8/1996 | Henderson et al. | 395/200.06 |
| 5,564,044 | A | | 10/1996 | Pratt | 395/600 |
| 5,579,087 | A | * | 11/1996 | Salgado | 399/1 |
| 5,581,686 | A | | 12/1996 | Koppolu et al. | 395/340 |
| 5,583,970 | A | | 12/1996 | Strobel | 395/114 |
| 5,596,700 | A | | 1/1997 | Darnell et al. | 395/340 |
| 5,606,609 | A | | 2/1997 | Houser et al. | 380/4 |
| 5,726,897 | A | * | 3/1998 | Tammi et al. | 364/478.09 |
| 5,768,505 | A | * | 6/1998 | Gilchrist et al. | 709/201 |
| 5,860,073 | A | * | 1/1999 | Ferrel et al. | 707/522 |
| 5,880,740 | A | * | 3/1999 | Halliday et al. | 345/435 |
| 5,889,518 | A | * | 3/1999 | Poreh et al. | 345/340 |
| 5,956,693 | A | * | 9/1999 | Geerlings | 705/14 |
| 5,974,413 | A | * | 10/1999 | Beauregard et al. | 707/6 |
| 6,161,148 | A | * | 12/2000 | Pratt et al. | 709/315 |
| 6,230,173 | B1 | * | 5/2001 | Ferrel et al. | 707/513 |

* cited by examiner

OLE AUTOMATION SERVER FOR MANIPULATION OF MAIL PIECE DATA

RELATED APPLICATION

Reference is made to Application Ser. No. 08/997,708, now U.S. Pat. No. 6,253,219, entitled A METHOD FOR UTILIZING THE POSTAL SERVICE ADDRESS AS AN OBJECT IN AN OBJECT ORIENTED ENVIRONMENT, assigned to the assignee of this application.

BACKGROUND OF THE INVENTION

Mailpiece production systems are an example of systems whose purpose is to utilize address lists, perform addressing hygiene through the use of address correction techniques, and, download data to addressing printers, collators, sealers, and the like for the purpose of producing a mailpiece. Mailpiece production systems are known in the art and have developed with changes in postal service regulations (such as those of the United States Postal Service, or USPS) and with the proliferation of appropriate software applications. In turn, this production has served the need to automate and accelerate to accommodate growth.

As the USPS, together with the postal services of other countries around the world, moves toward more fully automated mail handling in an effort to contain costs while processing ever increasing volumes of mail, automated equipment which sorts and processes mail on the basis of machine readable postal codes, such as the “zip code” or other forms of postal coding, play an ever more significant role. In the United States, postal service regulations provide for a “Postnet” bar code which represents the five or nine digit zip code of the destination address in a machine readable form.

Systems have been used or proposed to meet the need to produce mail pieces imprinted with the Postnet bar code, and to enable mailers to obtain the benefit of the discounts offered for such mail. One such system is described in U.S. Pat. No. 4,858,907, for a SYSTEM FOR FEEDING ENVELOPES FOR SIMULTANEOUS PRINTING OF ADDRESSES AND BAR CODES, issued to Eisner et al. (hereinafter referred to as Eisner-1) on Aug. 22, 1989. This patent discloses a system for printing envelopes with addresses, zip codes, and corresponding bar codes. The system is controlled by a computer which includes software for converting a zip code included in the address into bar code form and then adding the bar code representation to the material to be printed on the envelope.

Another example of the art is found in U.S. Pat. No. 5,326,181 for an ENVELOPE ADDRESSING SYSTEM ADAPTED TO SIMULTANEOUSLY PRINT ADDRESSES AND BAR CODES; issued on Jul. 5, 1994 to Eisner et al. (hereinafter referred to as Eisner-2). This patent teaches a method of addressing substrates with a human readable address containing a zip code and a bar code corresponding to the zip code. The method utilizes a computer and comprises several steps. These steps include: receiving in the computer a plurality of addresses, with pre-existing zip code information contained in each as complete address data, and requiring no manual inputting or identification; automatically scanning the address data in the computer to find the pre-existing zip code; automatically converting, in the computer, the pre-existing zip code into a line of corresponding bar code; and, essentially simultaneously printing the complete address, including zip code information and corresponding bar code, on a substrate, under control of the computer so that the substrate produced has human readable zip code and machine readable bar code information thereon.

Additionally, a system for printing envelopes with addresses including bar code is disclosed in commonly assigned U.S. Pat. No. 5,175,691 for a SYSTEM AND METHOD FOR CONTROLLING AN APPARATUS TO PRODUCE ITEMS IN SELECTED CONFIGURATIONS; issued on Dec. 29, 1992 to Baker et al. (hereinafter referred to as Baker), which describes a system for printing mail pieces which includes a printer for printing sheets and envelope forms and a folder-sealer mechanism for folding the envelope form around the sheets to form a mail piece, and a computer based control system for controlling the printer and folder. In the system of this application, when an operator is creating a file of letters to be printed, the operator may designate a selected field within each letter as containing the destination address. The system will then extract the information in this designated field and with it create a new page of material to be printed on the envelope form; and, if the address within the designated field includes a zip code, the system will add a corresponding barcode to the new page. The system then adds this new page to the file before the file is output.

U.S. Pat. No. 5,278,947 for a SYSTEM FOR AUTOMATIC PRINTING OF MAIL PIECES; issued Jan. 11, 1994 to Balga, Jr. et al. (hereinafter referred to as Balga), and assigned to the assignee of the present claimed invention, is for a system which includes a printer for printing text in response to the input of signals. The printer has a capability to selectively print either sheets or envelopes. The system further includes a controller for output of a sequence of signals representative of materials to be printed on a sheet which forms part of the mail piece, where the sequence includes a subset of signals representative of an address.

In accordance with another aspect of the Balga invention, the system includes a scanning mechanism for identifying a character string which conforms to a valid postal coding standard. The system further includes a mechanism for identifying the character string as a valid postal code. Additionally, the system forms the destination address to include a line including the postal code and a selected number of proceeding lines of text.

The ability to structure software coding is extremely important when linking data to be downloaded to a printer being utilized in the addressing environment. U.S. Pat. No. 5,583,970 for a PRINTER COMMAND SET FOR CONTROLLING ADDRESS AND POSTAL CODE PRINTING FUNCTIONS, issued Dec. 10, 1996 to Strobel (hereinafter referred to as Strobel), and assigned to the assignee of the present claimed invention, is instructive in this respect.

Strobel is a method and system for printing images to a substrate wherein the commands normally input by an operator, or resident within the printer, can be determined at a host data processor. The system can control address and postal code printing functions beginning at the host computer together. The system will derive printing data, including address data, from a selected application resident in the host computer. The host computer creates and then transmits printer command sets and printing data, via transmitting means to a microprocessor within the printer. The microprocessor drives a language interpreter which directs the printer commands to a parsing step for determining the address location from within the data to be printed. The language interpreter then assigns delivery point digits to a zip code that was isolated from the transmitted address data. The newly created zip code is then matched with the bar code data stored within the microprocessor's corresponding memory. A bar code corresponding to the new zip code is selected. The language interpreter then directs the printer's controller to prepare to print the address with its corresponding zip code, any graphics images that may have been included within the print data, and text, if any. The printer controller positions the bar code for printing, and then prints the bar code and address data, zip code, and any graphics images and text to an envelope or other substrate.

Thus, Strobel overcame the limitations of the prior art by providing flexibility in determining what data, and how much, may be downloaded for printing to a substrate. Flexibility is accomplished by controlling address and postal coding functions in the printer from a host computer. The invention thus simplifies the firmware required in a selected printer, or can allow the performance of additional tasks or provide for greater database functionality under the direction of the printer microprocessor. Thus, printer ROM memory can be reduced or freed up for other tasks, and RAM memory can be increased to handle more detailed data.

As the capabilities of data processing systems has grown, so too have the requirements that are tasked to these systems. Greater speed in these systems has given rise to more detail-oriented applications, greater memory capability has made memory intensive applications more attractive, and detailed applications have lead to more wide-spread use of previously inaccessible data processing abilities. With the spiraling growth in data processing ability, there has grown a need for more efficient ways of programming that promote speed as well as flexibility. Flexibility, in particular, allows applications that have been designed in varied programming languages, or operating on different platforms to be able to communicate without extensive system or file modification.

One such means of promoting flexibility within a data processing system is the use of "object-oriented" design (OOD). Object oriented programming languages are useful in removing some of the restrictions that have hampered application design due to the inflexibility of traditional programming languages.

OOD utilizes a basic element or construct known as the "object," which combines both a data structure and an intended behavior characteristic within the single element. Objects are bundles of data and the procedures which best identify the use of that data. Objects can be specific or conceptual and are often used to represent models of real-world object groupings; this has the effect of helping software applications become an organized collection of discrete objects in which data is held or moved based on the intended behavior of an object which is inherently unique. Each object knows how to perform some activity.

The objects interact and communicate with each other via messages. A message is initiated by one object for the purpose of getting a second message to perform an act such as performing the steps of a method. Information parameters may be passed along with the message so that the receiving object will have guidelines for performing its action.

Software objects share two characteristics; they all have "state" and "behavior." State is the condition of the object expressed in variables (what it can knows), while behavior is implemented by performance of a method (what it can do). Packaging the object's variables, together with its methods, is referred to as "encapsulation." Encapsulation is used to hide unimportant implementation details from other objects; and, this in turn provides two primary benefits to software developers. These benefits are: (1) modularity and (2) information hiding.

Modularity of objects means that the source code for an object can be written and maintained independently of the source code for other objects, thus allowing a certain autonomy of purpose for each individual object. Information hiding, on the other hand, is the ability to keep private certain of its data and methods without effecting the other objects which may depend upon it. Common dependencies among objects can maintain communication by utilizing a public interface for information sharing.

Objects interact and communicate with each other though the use of messages. Each message has three components that are necessary for a receiving object to be able to perform a desired method; these are: (1) the object to whom the message is addressed; (2) the name of the method that is to be performed; and (3) the method required parameters. Because these three components alone represent what is required for methods to be activated, it is not required that objects be located within the same process in order for communication to take place. Message use, therefore, is the supporting means for object interaction. But to be of value to a particular application, objects must be able to be referenced.

Referencing is accomplished through indexing, addressing, or through value assignment which can be placed in a table for use as required. Objects can also be arranged by classification. Classification is based on groupings of objects based upon properties or characteristics important to an application or requirement. Each class describes a potentially infinite set of objects that comprise that class. Object interaction can be further optimized by the use of class distinction. Classes are organizational blueprints that define the variables and methods which are common to all objects of a particular group. Values for each of the variables are assigned and allocated to memory when an instance from a class is created. Additionally, methods can only be performed when a class instance has been allocated to memory. Thus, the most distinct advantage of class use is the ability to reuse the classes and thus further create more objects. Classes, in turn, can be subdivided into subclasses which inherit the state of the underlying class. The further advantage being the ability to create specialized implementations of methods.

The constant growth and expansion of software systems and the hardware platforms that support them has led to the emergence of object oriented programming which reduces time and memory capacity requirements by taking advantage of certain redundancies by treating them as unique software objects.

The advantages of objects lie in the ability of objects to link performance characteristics. The linking of objects to applications is done through object linking and embedding techniques known by the acronym "OLE." This greatly optimizes the using system's ability to find data and use it effectively. Systems that utilize formats whose structure and requirements repeat, would benefit greatly from object oriented techniques. And, if the system were to be able to define its principle data requirements in the form of objects, it would inherit the advantages of the object oriented environment while maintaining the inherent system advantages.

OOD is known in the software arts and specific discussion of application design based upon OOD is not required for a thorough understanding of the applicant's claimed invention. It is, however, one object of the present claimed invention to disclose a method and system for utilizing object oriented design to effectively and efficiently link applications within a mailpiece production system.

The mailing systems art can clearly benefit from a method that captures the data field of the USPS address (or of any similar postal service defined address) and employs that method within a system that links it with the benefits of methods such as Strobel. Therefore, it is an object of the present invention to provide for a means of determining postal service and mailpiece production requirements; create objects derived therefrom; and, then utilize those objects to optimize mail piece production.

SUMMARY OF THE INVENTION

The limitations of the prior art are overcome by a method for creating a mailpiece object, in an object oriented development environment of a data processing system for embedding within one or more software applications.

The method includes encapsulating a software control within an object to form a mailpiece object, wherein the mailpiece object is OLE enabled. Encapsulation of the software control provides a software application with a set of mailpiece production capabilities when the mailpiece object is embedded within the application.

The method begins with the instantiation of the mailpiece object by registering a class within the data processing system and naming the class. The instantiation establishes a programming interface for the mailpiece object. The properties of the mailpiece object are established by: placing a set of object methods; a set of mailpiece production functionalities; and, a set of data tables within the mailpiece object by utilizing the programming interface. A human interface for the mailpiece object is next established; its purpose is for allowing data to be displayed to a system operator under direction from the object methods. The human interface is placed within the mailpiece object by utilizing the programming interface. The mailpiece object is then embedded within a software application; and the embedded mailpiece object is utilized to produce a mailpiece under direction of the software application.

Once embedded in the one or more software applications as selected by the data processing system and the system user, the embedded mailpiece object becomes an OLE enabled OCX and, the OCX further includes a set of pre-determined mailpiece production functions and a property setting comprising selectable functionality for one or more postal markets. An OCX is an Object Linking and Embedding (OLE) custom control or special-purpose program, that can provide such functions as the handling of scroll bar movement and window resizing. Object Linking and Embedding was designed to support compound documents which contain multiple information types, such as text, graphic images sound, motion, and video. An OCX (or ActiveX control) is actually implemented as a Dynamic Link Library (DLL) module. The selectable functionality is includes one or more tables wherein each is representative of the mailpiece requirements for a corresponding postal service.

The software application itself comprises mailpiece production capabilities, which further comprise: mailpiece design functionality; mailpiece display functionality; and mailpiece printing functionality. The mailpiece production capabilities further include having interface links to one or more software applications whereby the mailpiece object can be linked or embedded as required by each of the software applications.

The data tables further comprise: a plurality of printing field data; rules for use of printing field data; rules for determining an address sub-field based upon comparison to postal service address field rules; rules for calculating a delivery point barcode in respect of said address sub-field; rules for calculating a Postnet barcode in respect of the address sub-field; and, rules for linking the mailpiece object with postal indicia printing capability such as found in a systems oriented postage meter, or a personal computer meeting postal service specifications.

The object methods additionally include action instructions. The action instructions further comprise: display instructions for instructing the data processing system to display data on a monitor or other display; storage instructions for instructing the data processing system to store data within a memory; and printing instructions for instructing the data processing system to print data on an output device.

DETAILED DESCRIPTION OF THE PREFERRED EMBODIMENTS

Figure 1:
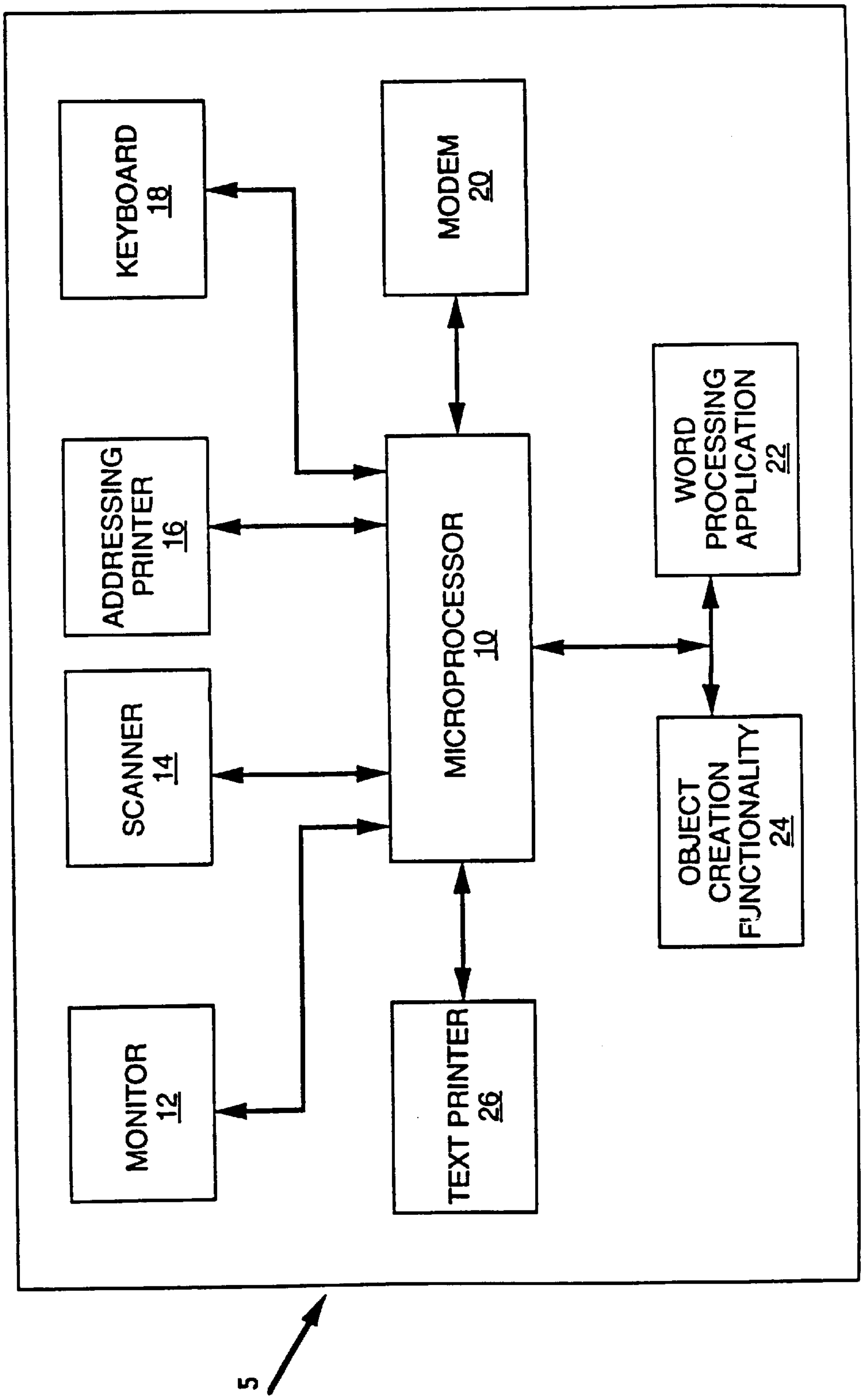
FIG. 1 is a block diagram of a typical system within which the method of the present invention could reside and be utilized.

Turning to FIG. 1, there is shown a block diagram of a typical system 5 within which the method of the present invention could reside and be utilized.

System 5 comprises a microprocessor 10 interoperatively connected to monitor 12 for viewing documents. The viewing of documents on monitor 12 promotes ease of use in word and data processing, and provides an example of the human interface that can be brought to system 5 by the methods proposed herein. Microprocessor 10 is interoperatively connected to scanner 14. Scanner 14 provides system 5 with the ability to scan address field data, barcodes, or other scannable data sources as an input to word processing application 22. Addressing printer 16 and text printer 26 are also interoperatively connected to microprocessor 10 and serve as the output devices by which address data or documents can be printed to a substrate. Additionally, keyboard 18 is interoperatively connected to microprocessor 10 and serves as an input device for the creation of documents or the input of data. Modem 20 gives system 5 the ability to communicate with other systems via communications means of varied types.

It should be noted that system 5, as shown, can be expanded upon in a variety of ways to produce mailpieces more effectively, with greater throughput, or with more detail. Among the peripheral devices that can be effectively added to system 5, in a variety of configurations are: sorters; inserters; sealers; and, postage meters.

Figure 2:
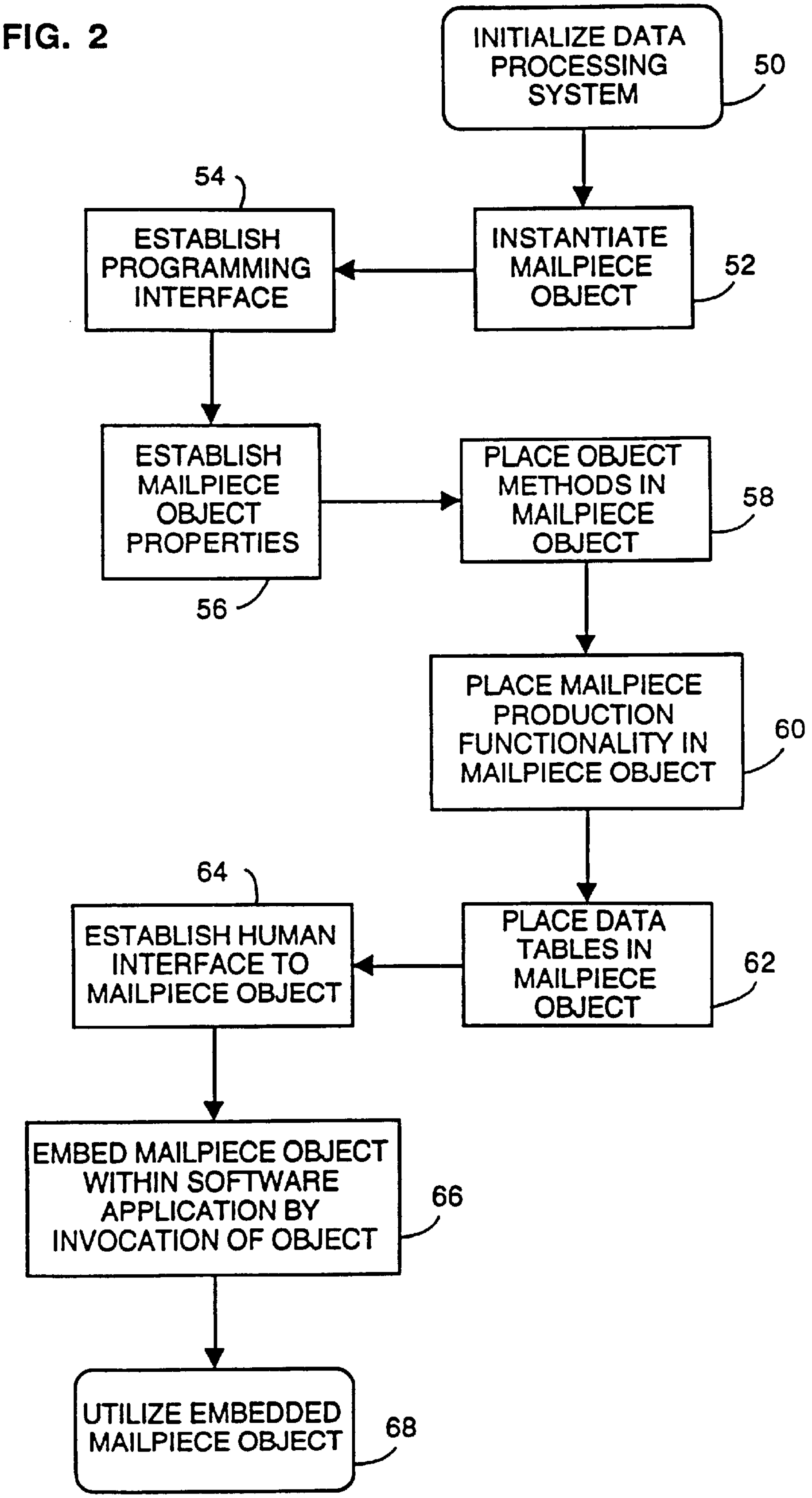
FIG. 2 is a flowchart of the method utilized to create the mailpiece object.

Turning to FIG. 2, there is shown a flowchart of the method utilized to create the address object 200 which is further described with reference to FIG. 3B. A detailed discussion of object oriented programming is not required for a full understanding of the method described hereunder.

The creation of the address object 200 begins at step 50 when a system user initializes a data processing system which has an object creation functionality resident therein. From step 50, the method advances to step 52 where the method instantiates a mailpiece object by registering an object class with the object creation functionality. Registration of the class establishes, at step 54, a programming interface that will be used as a port of entry into the object. The port of entry will allow the system to place class properties within the object. The system user will determine the properties of the class at step 56. The specific properties of the mailpiece object are discussed in the description of FIG. 3A.

From step 56, the method advances to step 58 where object methods are placed within the mailpiece object by entering them through the programming interface. The method then advances to step 60 where mailpiece production functionality is placed within the address object 200 by entering it through the programming interface. In succession, mailpiece production data tables, and a human interface are placed within the mailpiece object by entering them through the programming interface in steps 62 and 64 respectively. It should be noted that steps 60 through 64 can be performed in any order so long as each of the step actions are performed prior to utilization of the object.

When the properties of the mailpiece object 200 have been placed into the object, the method advances to step 66 where the mailpiece object is embedded or linked (OLE) where the mailpiece object can be used for its intended purpose when invoked at step 68. The use of the mailpiece object 200 reduces the steps necessary to apply mailpiece production functionality and is thus a significant improvement over the prior art. The properties of the mailpiece object will now be discussed in detail with reference to FIGS. 3A and 3B.

Figure 3A:
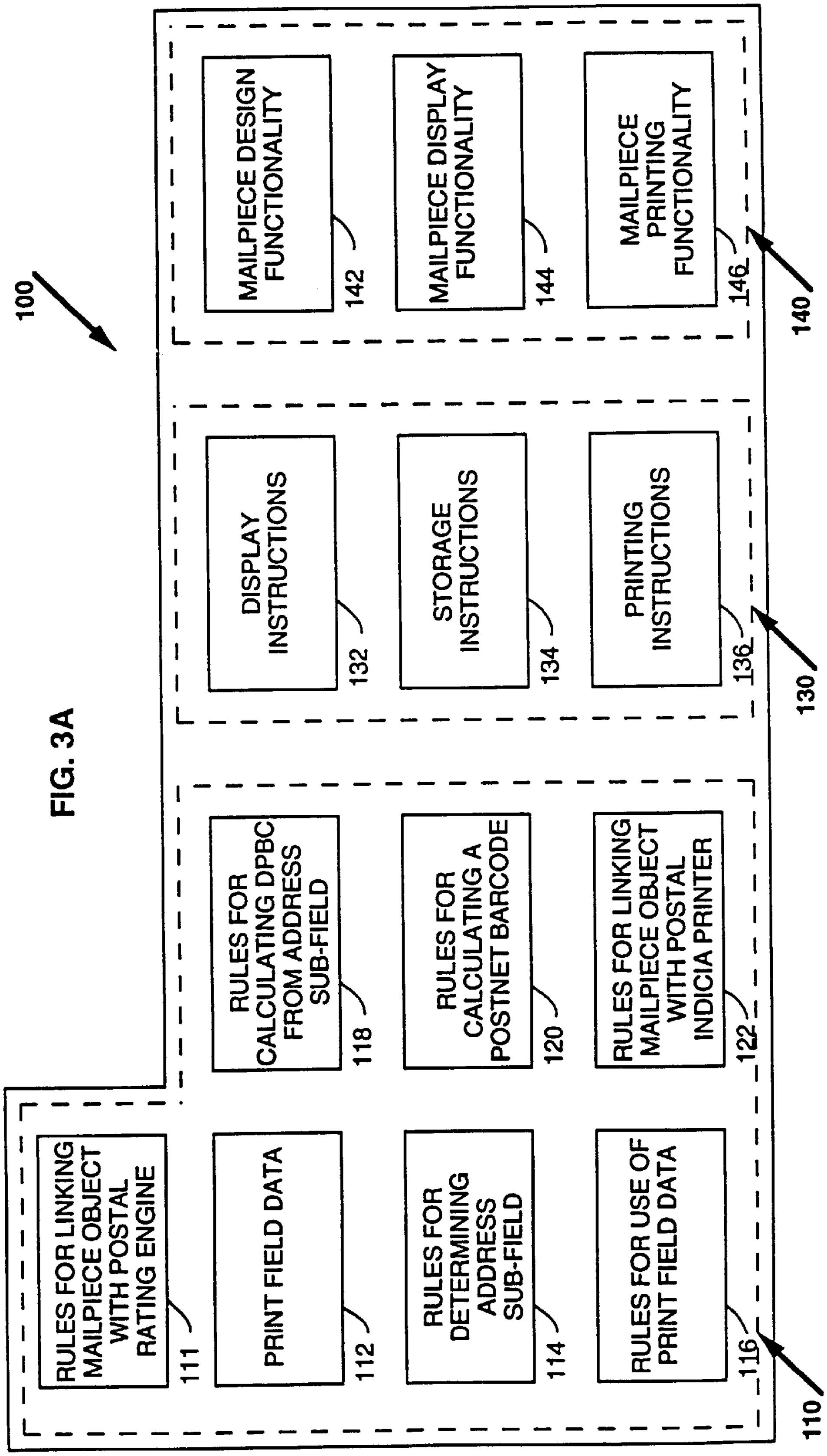
FIG. 3A is a block diagram of the mailpiece object properties that are input to the object through a programming interface.

Turning to FIG. 3A, there is shown a block diagram of the mailpiece object properties 100 that are input to the object through a programming interface 202. The mailpiece object properties 100 are divided into functional groupings 110, 130, and 140.

Functional grouping 110 comprises table data (hereinafter 110) that can be utilized by the object methods 130 or production functionality tools 140 within the object 200 or in its general environment. The data tables 110 further include: rules 111 for linking the mailpiece object with postal rating engines of the type used to determine postage values so that a postal indicia can be printed; print field data 112; rules 114 for determining address sub-fields; rules 116 for use of print field data; rules 118 for calculating the delivery point bar code (DPBC) from the address sub-field; rules 120 for calculating a Postnet barcode; and, rules 122 for linking the mailpiece object 200 with a postal indicia printer.

Functional grouping 130 comprises object methods (hereinafter 130) which include: display methods 206 for displaying the mailpiece characteristics to the system user; storage methods 208 for storing document layouts within an associated memory of system 5; and, printing methods 210 which cause human interface 214 to direct a printer, such as addressing printer 16, to print data under the direction of the object.

Additional functionality for address object 200 is provided by functional group 140. This functionality performs a unique role and includes: a mailpiece design functionality 142 which comprises a set of rules for applying postal coding requirements with respect to placement of data on the face of the mailpiece; mailpiece display functionality 144 which displays the face of the mailpiece on a monitor 12 for ease of use and manipulation by a system user; and, mailpiece printing functionality 146 which includes those controls and interfaces for causing an addressing printer 16 or a text printer 26, or both, to produce a printed mailpiece. Each of the functionalities works together so that the printed mailpiece effectively embodies the mailpiece that was intended by the system user.

Figure 3B:
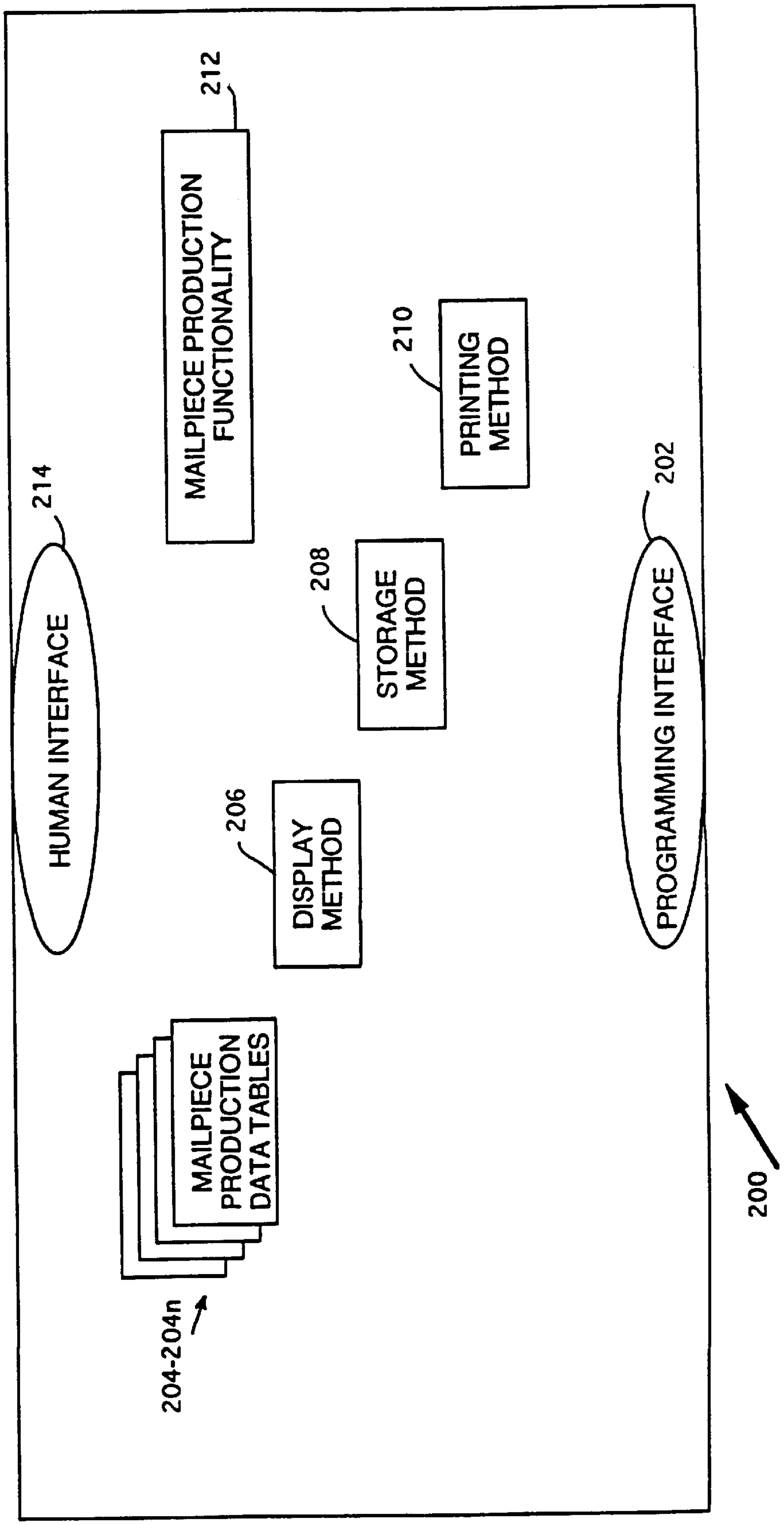
FIG. 3B is a block diagram of the mailpiece object and its constituent sub-elements.

Turning to FIG. 3B, there is shown a block diagram of the address object 200 and its constituent sub-elements.

The mailpiece object 200 contains a programming interface 202 which serves as the portal by which properties of the mailpiece object 200 can be entered into it. The programming interface 202 is returned by the data processing system when the mailpiece object 200 is instantiated, thus allowing the mailpiece object 200 to be invoked as needed.

In applications such as Visual Basic, an object oriented designer would use a command such as "createobject" to instantiate the object. The "createobject" command returns a programming interface such as "interface.$_{13}$" which will allow the designer to place the necessary properties into the object by entering their file name after the interface command.

The mailpiece object 200 has specific requirements; therefore, through the programming interface 202 will come: a human interface 214; mailpiece production data tables 204–204*n*; mailpiece production functionality 212; and, a set of methods comprising display method 206, storage method 208, and printing method 210. Each of these elements is described in more detail hereinbelow.

Human interface 214 allows mailpiece object 200 to provide a visual interface to the system user; additionally, printing methods 210 as contained in address object 200 cause human interface 214 to direct a printer, such as addressing printer 16, to print data under the direction of the object. Thus, the purpose of human interface 214 is to provide the path for user interface functionality.

Additional functionality for mailpiece object 200 is provided by mailpiece production functionality 212. This functionality performs a unique role. Mailpiece production functionality 212 includes: a mailpiece design functionality 142 which comprises a set of rules for applying postal coding requirements with respect to placement of data on the face of the mailpiece; mailpiece display functionality which displays the face of the mailpiece on a monitor 12 for ease of use and manipulation by a system user; and, mailpiece printing functionality which includes those controls and interfaces for causing an addressing printer 16 or a text printer 26, or both, to produce a printed mailpiece. Each of the functionalities works together so that the printed mailpiece effectively embodies the mailpiece that was intended by the system user.

Mailpiece production data tables 204–204*n* provide much of the production capability data utilized by the mailpiece object 200. Mailpiece production data tables 204–204*n* include a number of fields from which an optimal data field will be constructed by mailpiece production object 200; these further include: print field data 112; rules 114 for determining address sub-fields; rules 116 for use of print field data; rules 118 for calculating the delivery point bar code (DPBC) from the address sub-field; rules 120 for calculating a Postnet barcode; and, rules 122 for linking the mailpiece object 200 with a postal indicia printer.

Paths of movement are further dictated by mailpiece object 200 through the use of its distinct method elements.

Display method 206 is used for instructing the data processing system 5 to display data on monitor 12. Storage method 208 is used for maintaining instructions for the data processing system 5 to store data in its associated memory or within a peripheral device. Printing method 210 is used for instructing the data processing system 5 to print data on output means such as addressing printer 16, or a separate text printer 26.

Figure 4A:
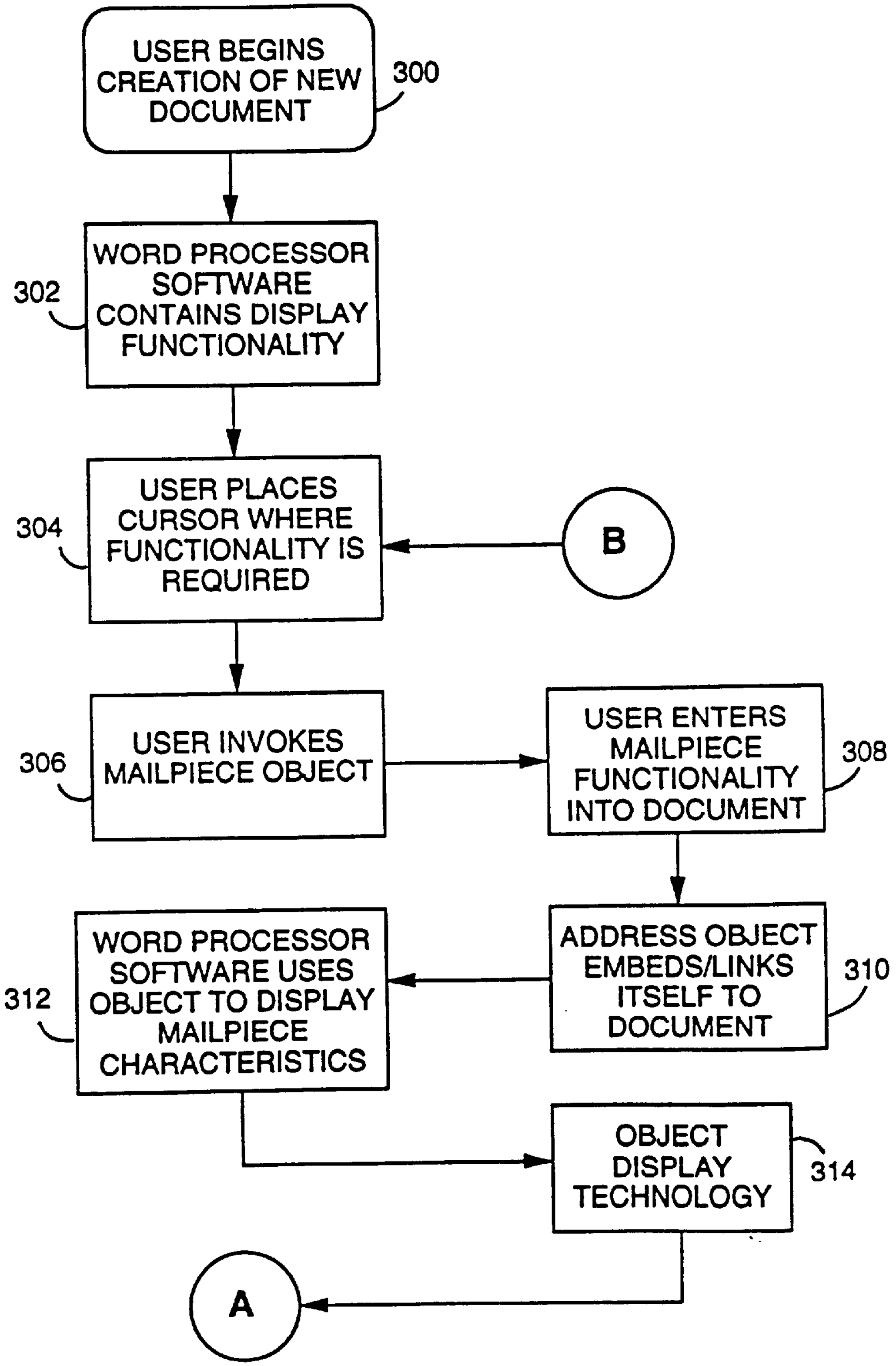
FIG. 4A is an upper level flowchart of the method of utilizing a mailpiece object to apply mailpiece production functionality to a mailing system.
Figure 4B:
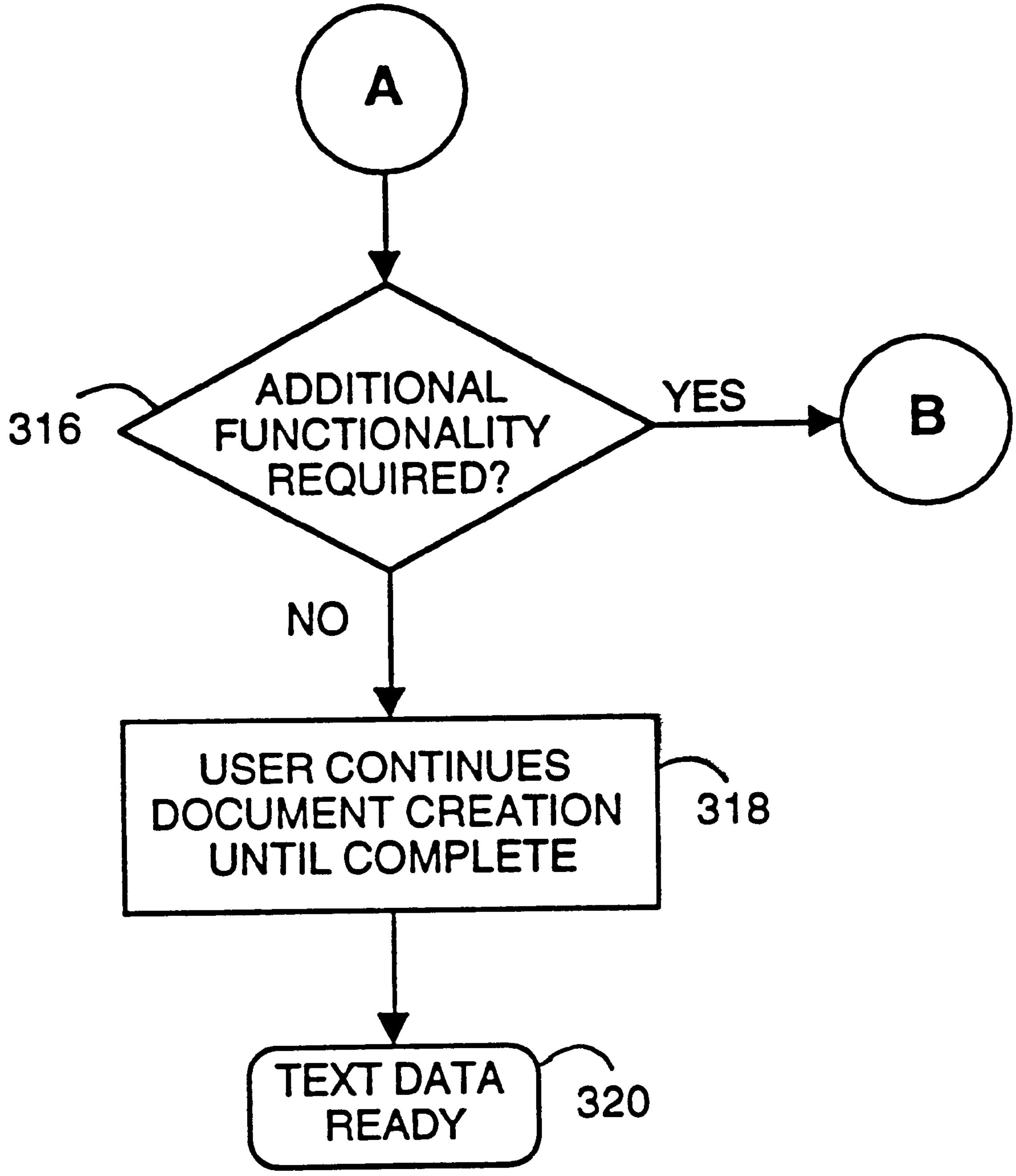
FIG. 4B is a continuation of flowchart 3A.

Turning to FIGS. 4A and 4B, there is shown an upper level flowchart of the method of utilizing a mailpiece object to apply mailpiece production functionality to a mailing system such as system 5.

In FIG. 4A, the method begins at step 300 when a system user begins to create a new document within a word processing, or similar, application of a data processing system 5. As the document text is being created, and essentially simultaneously with step 300, step 302 displays the text to the system user on a monitor 12 through the use of display technology embedded within the word processor application 22.

During the continued creation of the document, the system user, at step 304, would typically place the application's cursor where certain functionality is to be added to the document. The method then advances to step 306 where the system user invokes the mailpiece object 200.

Invocation of the mailpiece object 200 can be determined through any one of several design possibilities that include the use of an entry command through the use of a keyboard 18 stroke, the entry of scanned data from a scanner 14, or the entry of downloaded data through a modem 20 or suitable communications link. The object is created by the system on an "as needed" basis, depending upon the predetermined design of the object.

The mailpiece functionality is entered into the document at step 308 through the use of a keyboard 18 entry, though it is contemplated that entry could be made by scanning the data or selecting it from another file available to the word processing application through storage or download. This step is now under control of the mailpiece object's 200 properties 100. The method then advances to step 310 where the mailpiece object embeds or links itself to the document being created. The embedding/linking of the mailpiece object 300 now brings the mailpiece production functionality within the system and the document under the control of the object and thereby inheriting its characteristics.

From step 310, the method advances to step 312 where the word processing application 22 will use the mailpiece object 200 to display the mailpiece characteristics on the monitor 12 in conjunction with the application's own display technology. The mailpiece object 200 will control the display of the mailpiece characteristics at step 314, essentially simultaneously with the application's control in step 312. From step 314, the method advances along path A to step 316 as is shown in FIG. 4B.

Turning to FIG. 4B, there is shown path A, coming from FIG. 4A, entering the system flow at step 316.

The method generally allows the system user to add additional functionality, as required, by querying, at step 316, as to whether or not additional functionality required; the query can be either expressed or implied. If the response to the query is "YES," then the method would return to step 304 in FIG. 4A, via path B, and allow the user to place the cursor for another entry. If, however, the response to the query at step 316 is "NO," then the method advances to step 318 where the system user would continue with document creation until complete. From step 318, the method advances to step 320 where the text data is made ready for storage, use, or some other action.

The implementation of certain data processing applications and peripheral hardware components are what provide mailpiece functionality within the context of system 5. Word processing application 22 and object creation functionality 24 communicate with each other and with microprocessor 10 for the purpose of causing the system to build object oriented documents within a mailpiece production context.

While certain embodiments have been described above in terms of the system within which the mailpiece object methods may reside, the invention is not limited to such a context. The system shown in FIG. 1 is one example of a host system for the invention, and the system elements are intended merely to exemplify the type of peripherals and software components that can be used with the invention.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of producing a postal mailpiece under direction of a software application in a data processing system comprising the steps of:

(a) instantiating a mailpiece object by registering a class within said data processing system and naming said class, said instantiation establishing a programming interface for said mailpiece object;

(b) establishing the properties of said mailpiece object by:

(i) placing a set of object methods within said mailpiece object by utilizing said programming interface;

(ii) placing a set of mailpiece production functionalities within said mailpiece object by utilizing said programming interface; and (iii) placing a set of data tables within said mailpiece object by utilizing said programming interface, said data tables including at least one of printing field data, rules for use of printing field data, rules for determining an address sub-field based upon comparison to postal service address field rules, rules for calculating a delivery point barcode in respect of said address sub-field, rules for calculating a Postnet barcode in respect of said address sub-field, and rules for linking said mailpiece object with postal indicia printing means;

(c) creating a human interface to allow data to be displayed to a system operator under direction from said object methods, and placing said human interface within said mailpiece object by utilizing said programming interface;

(d) embedding said mailpiece object within said software application to provide said software application with a set of mailpiece production capabilities; and (e) utilizing said embedded mailpiece object to produce said postal mailpiece under direction of said software application.

2. The method of claim 1, wherein said mailpiece production capabilities comprises a set of mailpiece production routines.

3. The method of claim 2, wherein said mailpiece production routines further comprise:

(a) mailpiece design functionality;

(b) mailpiece display functionality; and (c) mailpiece printing functionality.

4. The method of claim 3, wherein said mailpiece design functionality further comprises interfacing links to a plurality of software applications whereby said mailpiece object can be linked or embedded as required by each of said plurality of software applications.

5. The method of claim 1, wherein said embedded mailpiece object is an OLE enabled OCX and, wherein said OCX comprises a set of predetermined mailpiece production functions.

6. The method of claim 1, wherein said set of object methods comprises action instructions; said action instructions further comprising display instructions for instructing said data processing system to display data on display means.

7. The method of claim 1, wherein said set of object methods comprises action instructions; said action instructions further comprising storage instructions for instructing said data processing system to store data in memory storage means.

8. The method of claim 1, wherein said set of object methods comprises action instructions; said action instructions further comprising printing instructions for instructing said data processing means to print data on output means.

9. The method of claim 5, wherein said OCX comprises a property setting, said property setting further comprising selectable functionality for one or more postal markets.

10. The method of claim 9, wherein said selectable functionality is further comprised of one or more tables wherein each of said one or more tables is representative of the mailpiece requirements for a corresponding postal service.

* * * * *